(12) United States Patent
Washima

(10) Patent No.: US 6,696,191 B2
(45) Date of Patent: Feb. 24, 2004

(54) FUEL CELL AND PROCESS FOR PRODUCING THE SAME

(75) Inventor: Mineo Washima, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 244 days.

(21) Appl. No.: 09/930,488

(22) Filed: Aug. 16, 2001

(65) Prior Publication Data
US 2003/0035990 A1 Feb. 20, 2003

(51) Int. Cl.⁷ .............................. H01M 4/00; H01M 8/10
(52) U.S. Cl. .............................. 429/31; 429/27; 429/32
(58) Field of Search ................................ 429/12, 13, 27, 429/30, 31, 32

(56) References Cited

U.S. PATENT DOCUMENTS

| 5,037,525 A | * | 8/1991 | Badwal ................... 204/421 |
| 6,077,409 A | * | 6/2000 | Lee et al. ................. 204/425 |
| 6,383,350 B1 | * | 5/2002 | Sehlin et al. ............ 204/286.1 |

FOREIGN PATENT DOCUMENTS

| JP | 10-334928 | 12/1998 |
| JP | 11-233128 | 8/1999 |
| JP | 2001-060461 | 3/2001 |

* cited by examiner

Primary Examiner—Bruce F. Bell
Assistant Examiner—Donald V. Scaltrito
(74) Attorney, Agent, or Firm—Foley & Lardner

(57) ABSTRACT

A fuel battery cell is provided which includes: an internal electrode and an external electrode respectively with predetermined lengths which are coaxially disposed while leaving a predetermined space between the internal electrode and the external electrode; and a composite layer with a predetermined length, having an electrolyte layer and internal and external catalyst layers provided respectively on both sides of the electrolyte layer. In this case, the composite layer is disposed in a predetermined space between the internal electrode and the external electrode while providing a gas passage between the composite layer and the internal electrode and providing a gas passage between the composite layer and the external electrode. In the composite layer, the surface of the internal catalyst layer on its gas passage side and the surface of the external catalyst layer on its gas passage side are covered respectively with waterproof layers.

8 Claims, 8 Drawing Sheets

FUEL CELL AND PROCESS FOR PRODUCING THE SAME

BACKGROUND OF THE INVENTION

1. Field of the Invention

The invention relates to a fuel cell and a process for producing the same. More particularly, the invention relates to a fuel cell which has a simple structure and can realize improved yield and reduced production cost, and a process for producing a fuel cell which can simplify a production process and can realize improved yield and reduced production cost.

2. Prior Art

In recent years, fuel cells using a solid electrolyte (for example, a solid polymeric film) as an electrolyte have drawn attention, for example, by virtue of no fear of liquid leakage unlike liquid electrolytes and, in addition, low mobility and easy uneven distribution of charges and polarization.

As shown in FIG. 1, this type of conventional fuel cells basically comprise a fuel battery cell 70 comprising a solid electrolyte film (for example, a solid polymeric film) 73 sandwiched between a pair of electrodes (a negative electrode 71 and a positive electrode 72) and, in its turn, between catalysts 71b, 72b (a waterproof layer 72c).

Further, as shown in FIG. 2, fuel gas (hydrogen gas and oxygen gas) supply pipings 76, 77 and a drainage pipe 78 are provided in the fuel battery cell 70 so that fuel gases are supplied through these pipings 76, 77 and the produced water is discharged through the pipe 78.

The power generation mechanism will be explained in conjunction with FIG. 1.

In the negative electrode 71, externally supplied hydrogen gas is passed through the negative electrode 71 and reaches near a reaction zone. Hydrogen molecules are divided into protons and electrons through the action of the catalyst 71b. Only the protons are passed through the solid electrolyte 73, while the electrons move to the negative electrode 71.

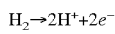

On the other hand, in the positive electrode 72, as represented by the following formula, two electrons are received from the positive electrode 72 in the presence of the catalyst 72b, and externally supplied oxygen molecules are reacted with water from the solid electrolyte 73 to produce hydroxyl ions.

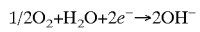

The protons, which have been passed through the solid electrolyte 73, are reacted with the hydroxyl ions to produce water. Thus, the whole circuit is formed. Therefore, the reaction of the whole fuel cell is represented by the following formula, and hydrogen and oxygen in the fuel gas are reacted with each other to produce water.

Further, as shown in FIG. 3, the above fuel battery cell 70 generally has a construction comprising: a portion comprising a catalyst 71b and a waterproof layer 71c provided respectively on both sides of the negative electrode 71 formed of an electrode sheet 71a; a portion comprising a catalyst 72b and a waterproof layer 72c provided respectively on both sides of the positive electrode 72 formed of an electrode sheet 72a; and the electrolyte 73 sandwiched between these two portions. Further, fuel gas passages (a hydrogen gas passage 74 and an oxygen gas passage 75) are provided respectively on both external sides of the above construction.

Further, in order to increase the capacity (voltage/current), a plurality of battery cells are stacked on top of each other or one another, and separation for insulation between electrodes is made, for example, through a separator.

Regarding this type of conventional fuel cells, for example, Japanese Patent Laid-Open No. 233128/1999 discloses a fuel cell having a construction such that a fuel gas passage is also provided in a separator and a circumferential groove is provided so as to surround an electrode. The claimed advantage of the fuel cell disclosed in this publication is that the adoption of the above construction can eliminate gas leakage and the like.

Japanese Patent Laid-Open No. 334928/1998 discloses a phosphoric acid fuel cell comprising: an electrolyte reservoir provided with a fuel gas supply groove; a gas-impermeable separator; a plurality of battery cells stacked on top of each other or one another to constitute a battery stack; and a cooling plate which has been inserted for each several cells in the battery stack. The claimed advantage of the fuel cell disclosed in this publication is that the adoption of the above construction can realize prolonged service life of the battery.

In the fuel cell disclosed in Japanese Patent Laid-Open No. 233128/1999, however, since the fuel gas passage is also provided in the separator, for each electrode in each battery cell, a circumferential groove surrounding the electrode should be provided from the viewpoint of preventing gas leakage. This renders the structure of the fuel cell complicate and thus inevitably leads to high production cost.

In the case of the phosphoric acid fuel cell disclosed in Japanese Patent Laid-Open No. 334928/1998 as well, a cooling plate should be inserted for each several cells in the battery stack. Therefore, here again this renders the structure of the fuel cell complicate and thus inevitably leads to high production cost.

SUMMARY OF THE INVENTION

In view of the above problems of the prior art, the invention has been made, and it is an object of the invention to provide a fuel cell which has a simple structure and can realize improved yield and reduced production cost, and a process for producing a fuel cell which can simplify the production process and can realize improved yield and reduced production cost.

The above object can be attained by the following features of the invention.

[1] A fuel cell comprising a fuel battery cell, said fuel battery cell comprising: an internal electrode and an external electrode respectively with predetermined lengths which are coaxially disposed while leaving a predetermined space between the internal electrode and the external electrode; and a composite layer with a predetermined length, comprising an electrolyte layer and internal and external catalyst layers provided respectively on both sides of the electrolyte layer, said composite layer being disposed in the predetermined space between the internal electrode and the external electrode while providing a gas passage between the composite layer and the internal electrode and providing a gas passage between the composite layer and the external electrode.

[2] The fuel cell according to the above item [1], wherein
the internal electrode is a hollow or solid internal continuous member having a plurality of grooves on its external surface,
the external electrode is a hollow external continuous member having a plurality of grooves on its internal surface, and
the gas passages are defined by the plurality of grooves in the internal continuous member and the plurality of grooves in the external continuous member.

[3] The fuel cell according to the above item [1], wherein the internal and external catalyst layers are provided respectively in face contact with both sides of the electrolyte layer.

[4] The fuel cell according to the above item [2], wherein the internal and external catalyst layers are provided respectively in face contact with a plurality of grooves in the internal and external continuous members.

[5] The fuel cell according to the above item [1], wherein at least one of the internal and external catalyst layers in the composite layer is covered with a waterproof layer.

[6] The fuel cell according to the above item [1], wherein the fuel battery cell is one of a plurality of fuel battery cells connected to each other or one another either in series or in parallel.

[7] A process for producing a fuel cell, comprising the steps of:
providing an internal electrode with a predetermined length;
providing a composite layer with a predetermined length, comprising an electrolyte layer and internal and external catalyst layers provided respectively on both sides of the electrolyte layer;
covering the internal electrode with the composite layer so as to form a gas passage between the internal electrode and the composite layer;
inserting the internal electrode covered with the composite layer into an external electrode with a predetermined length;
reducing the diameter of the external electrode to form a gas passage between the external electrode and the composite layer, and, at the same time, coaxially disposing the internal electrode and the external electrode to form a fuel cell.

[8] The process according to the above item [7], wherein
a hollow or solid internal continuous member having a plurality of grooves on its external surface is used as the internal electrode,
a hollow external continuous member having a plurality of grooves on its internal surface is used as the external electrode, and
the gas passages are defined by the plurality of grooves in the internal continuous member and the plurality of grooves in the external continuous member.

[9] The process according to the above item [7], wherein at least one of the internal and external catalyst layers in the composite layer is covered with a waterproof layer.

BRIEF DESCRIPTION OF THE DRAWINGS

The invention will be explained in more detail in conjunction with the appended drawings, wherein:

FIGS. 4A and 4B are schematic diagrams illustrating a first preferred embodiment of the fuel cell according to the invention, wherein FIG. 4A is an explanatory view showing the construction of the whole fuel cell and FIG. 4B a cross-sectional view taken on line A–B of the battery cell;

FIGS. 5A and 5B are schematic diagrams illustrating a second preferred embodiment of the fuel cell according to the invention, wherein FIG. 5A is an explanatory view showing the construction of the whole fuel cell and FIG. 5B a cross-sectional view taken on line C–D of the battery cell;

FIGS. 6A and 6B are schematic diagrams illustrating a third preferred embodiment of the fuel cell according to the invention, wherein FIG. 6A is an explanatory view showing the construction of the whole fuel cell and FIG. 6B a cross-sectional view taken on line E–F of the battery cell;

FIGS. 8A to 8C are schematic diagrams illustrating a first preferred embodiment of the production process of a fuel cell according to the invention, wherein FIG. 8A is a diagram showing the step of covering an internal electrode with a composite layer and inserting the covered internal electrode into an external electrode, FIG. 8B a diagram showing the state of the insertion of the covered internal electrode into the external electrode, and FIG. 8C a schematic cross-sectional view illustrating the step of, after the insertion of the internal electrode into the external electrode as shown in FIG. 8B, reducing the diameter of the external electrode by means of a die to form a gas passage; and FIGS. 9A and 9B are schematic cross-sectional views showing the construction of a gas introduction section in a battery cell, wherein FIG. 9A is a diagram showing an embodiment of the construction of a gas introduction section wherein hydrogen supply piping and oxygen supply piping are an provided at the end of the battery cell on its gas introduction section side while a drainage pipe is provided at the end of the battery cell opposite to the gas introduction section, and FIG. 9B a diagram showing an embodiment wherein all of the hydrogen gas supply piping, the oxygen gas supply piping, and the drainage pipe are provided at the end of the battery cell on its gas introduction section side.

DESCRIPTION OF THE PREFERRED EMBODIMENTS

Preferred embodiments of the invention will be explained in detail in conjunction with the accompanying drawings.

I. Fuel Cell

1. First Preferred Embodiment

Figure 1:
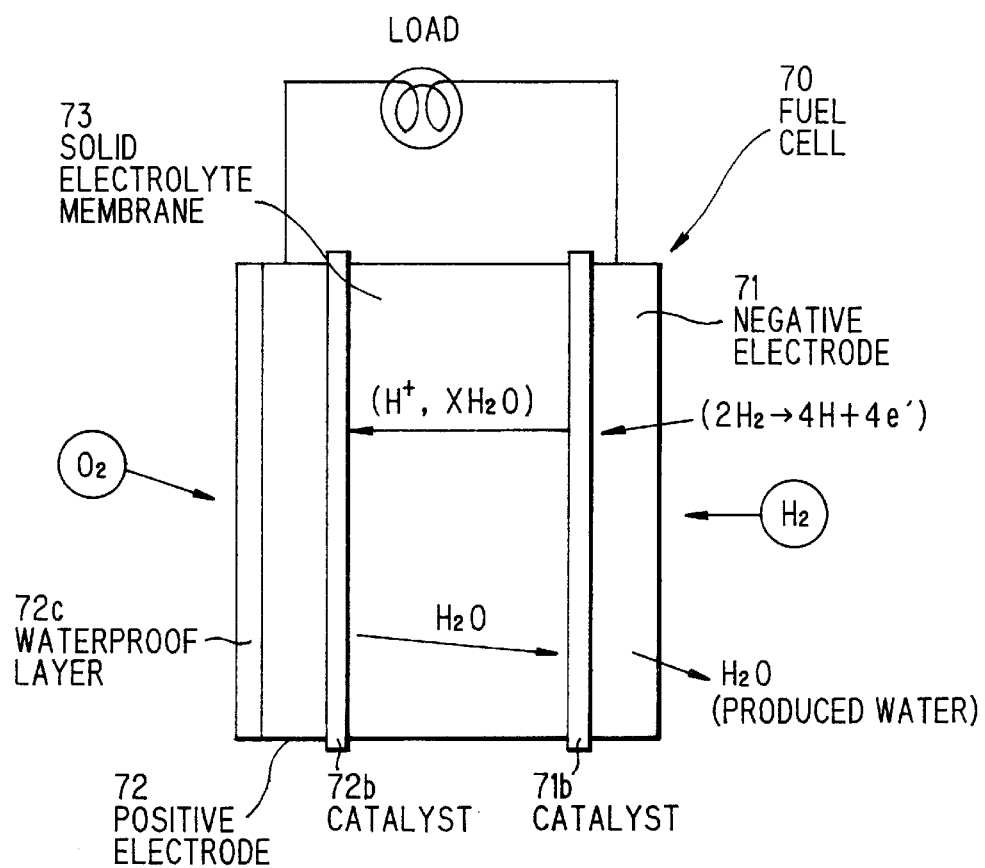
FIG. 1 is a schematic diagram illustrating the basic construction of a conventional fuel battery cell.
Figure 2:
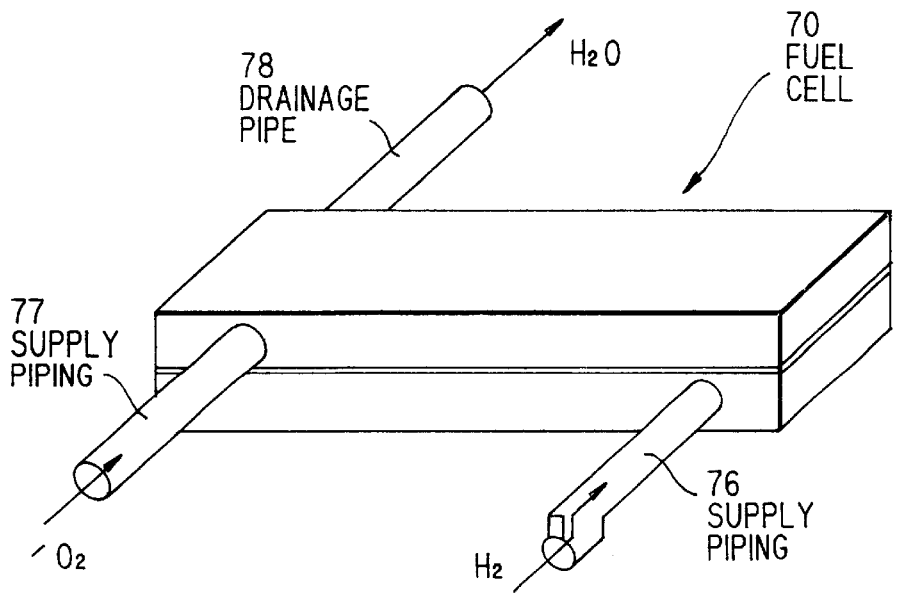
FIG. 2 is a schematic diagram illustrating the construction of the conventional fuel cell wherein fuel gas supply pipings and a drainage pipe have been connected to the fuel battery cell.
Figure 3:
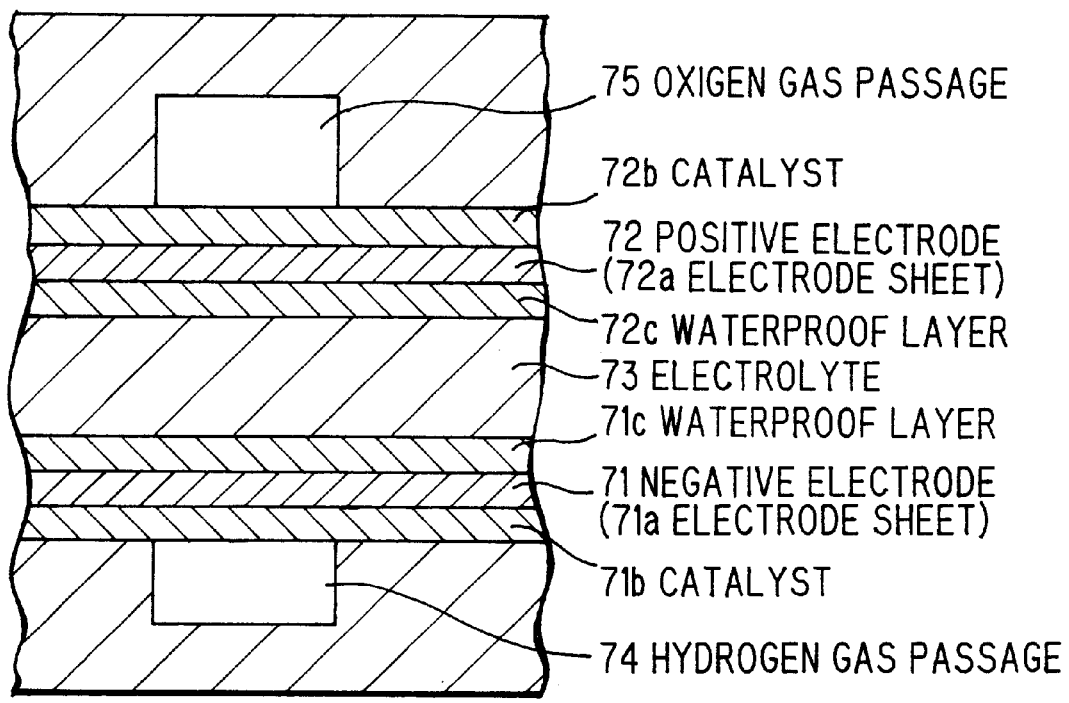
FIG. 3 is a schematic cross-sectional view of a fuel battery cell in a conventional fuel cell wherein fuel gas passages have been provided.
Figure 4A:
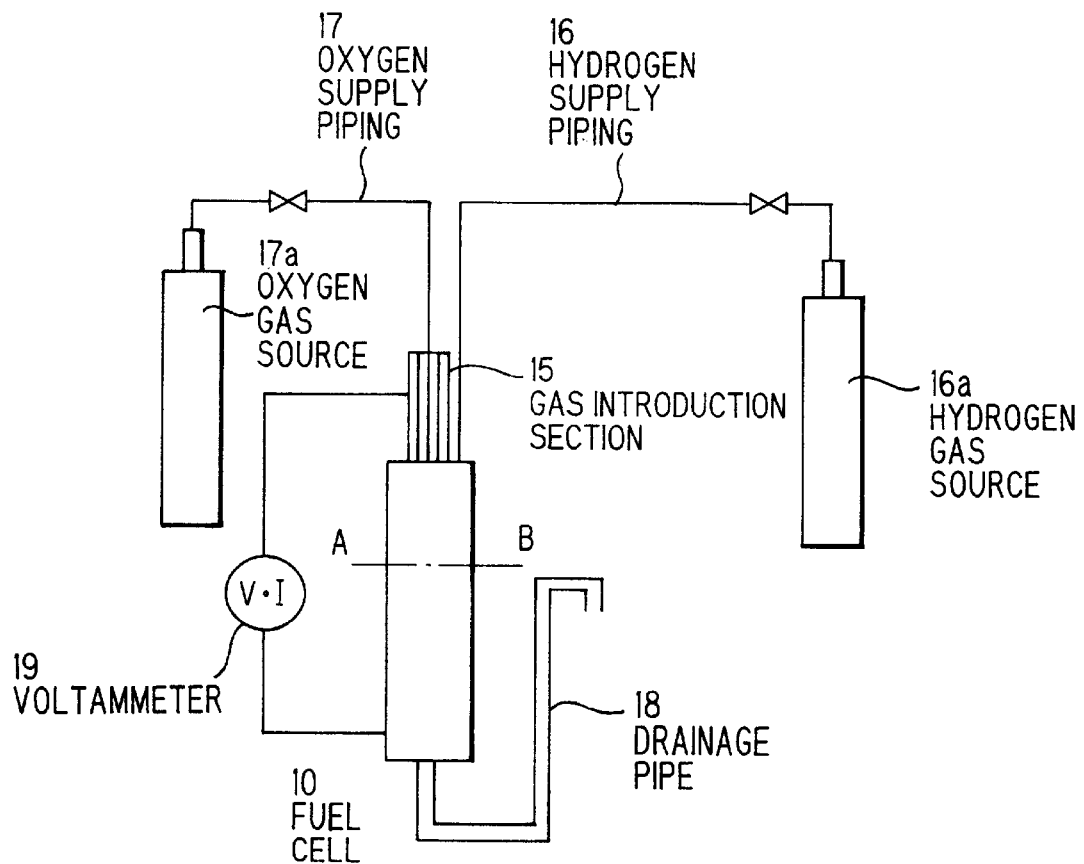

As shown in FIG. 4A, the first preferred embodiment of the fuel cell according to the invention comprises: a fuel battery cell 10; fuel gas supply pipings (hydrogen supply piping 16, a hydrogen gas source 16a, oxygen supply piping 17, an oxygen gas source 17a, and a drainage pipe 18) connected to the fuel battery cell 10; and a voltammeter 19.

Figure 4B:
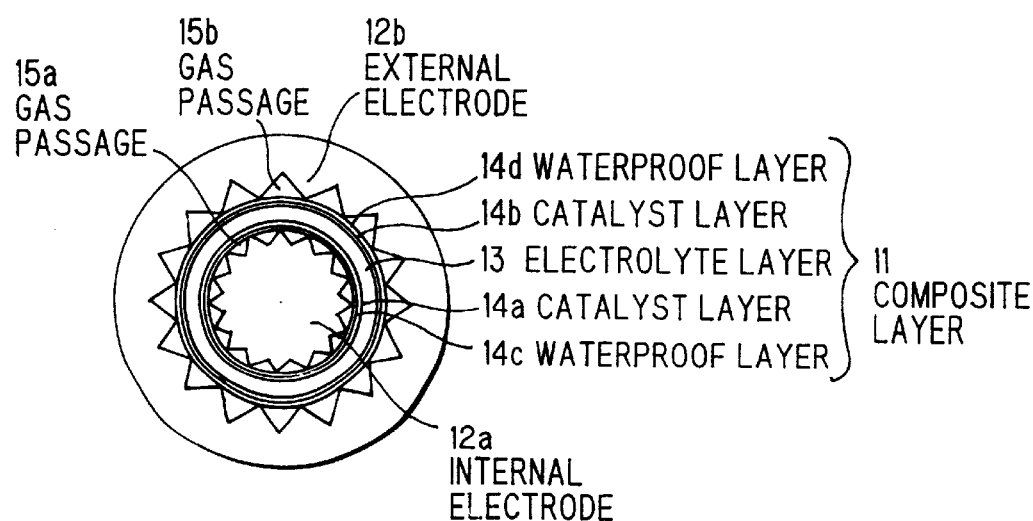

As shown in FIG. 4B, the fuel battery cell 10 comprises: an internal electrode 12a and an external electrode 12b respectively with predetermined lengths which are coaxially disposed while leaving a predetermined space between the internal electrode 12a and the external electrode 12b; and a composite layer 11 with a predetermined length, comprising an electrolyte layer 13 and internal and external catalyst layers 14a, 14b provided respectively on both sides of the electrolyte layer 13. Gas passages 15a, 15b are provided between the internal electrode 12a and the external electrode 12b while leaving a predetermined space between the internal and external electrodes 12a, 12b, and the composite layer 11 is disposed within the predetermined space.

Here the internal electrode 12a is formed of a hollow or solid internal continuous member externally provided with a plurality grooves, the external electrode 12b is formed of a hollow external continuous member internally provided with a plurality of grooves, and the gas passages 15a, 15b are defined by the plurality of grooves of the internal and external continuous members.

In the composite layer 11, the surface of the internal catalyst layer 14a on its gas passage 15a side and the surface of the external catalyst layer 14b on its gas passage 15b side are covered respectively with a waterproof layer 14c and a waterproof layer 14d.

There is no particular limitation on the internal electrode 12a and the external electrode 12b so far as the electrical resistance is low and, at the same time, the material is less likely to be attacked, for example, by water. Examples thereof include copper or copper alloys. Such metals may be single materials, or alternatively may have a multi-layer structure of a plurality of metals.

Electrolytes usable in the electrolyte layer 13 include, for example, solid organic electrolytes, aqueous alkaline solutions, and concentrated aqueous phosphoric acid solutions. Suitable solid organic electrolytes include, for example, solid polymeric films (ion-exchange membranes), such as phenolsulfonic acid films, polystyrenesulfonic acid films, polytrifluorostyrenesulfonic acid films, and perfluorocarbonsulfonic acid films.

An example of the catalyst layers 14a, 14b is such that platinum powder particles having a size of several tens of microns are sprinkled over electrically conductive graphite fibers and the outside of the assembly is covered with a breathable, water-repellent Teflon sheet.

The waterproof layers 14c, 14d may be formed of, for example, a water-impermeable plastic (for example, polyethylene terephthalate (PETF)). There is also no particular limitation on the shape of the catalyst layers 14a, 14b and the waterproof layers 14c, 14d, and, for example, the catalyst layers 14a, 14b and the waterproof layers 14c, 14d preferably have a net structure.

Further, regarding the shape of the groove in the internal electrode 12a and the external electrode 12b as well, there is no particular limitation so far as the shape causes no trouble as the fuel gas passage.

2. Second Preferred Embodiment

Figure 5A:
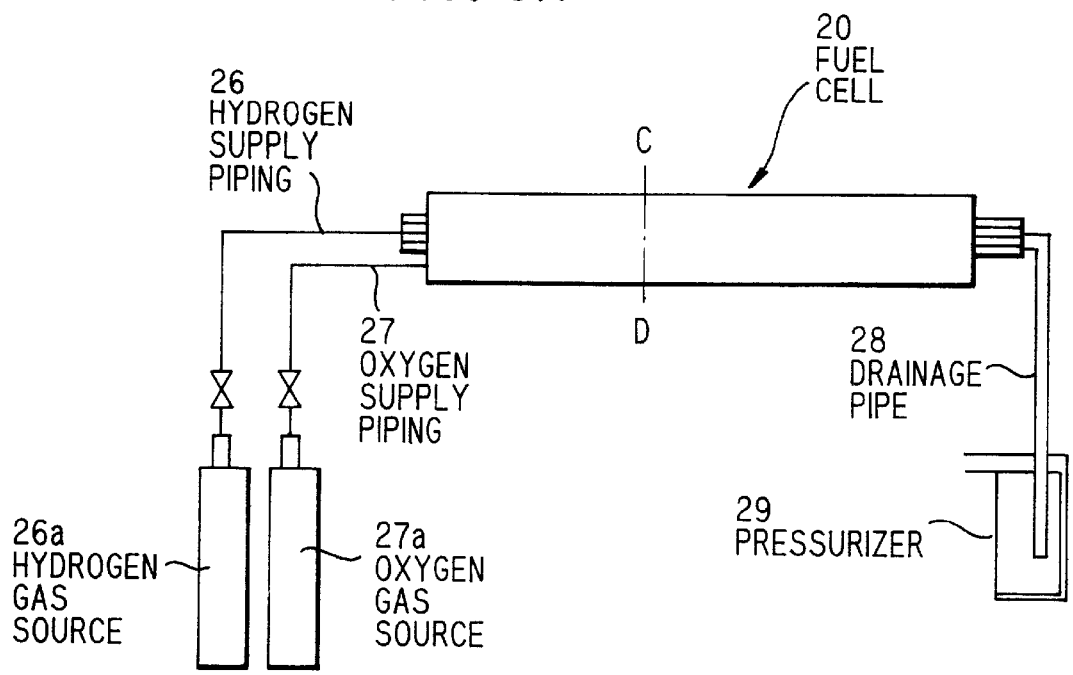

As shown in FIG. 5A, the second preferred embodiment of the fuel cell according to the invention comprises: a fuel battery cell 20; fuel gas supply pipings (hydrogen supply piping 26, a hydrogen gas source 26a, oxygen supply piping 27, an oxygen gas source 27a, and a drainage pipe 28) connected to the fuel battery cell 20; and a pressurizer 29. Here the pressurizer 29 is provided for preventing the leakage of hydrogen gas, and functions as a safety valve which, when the pressure of gas within the cell has become an abnormally high value, permits the gas to be released therethrough.

Figure 5B:
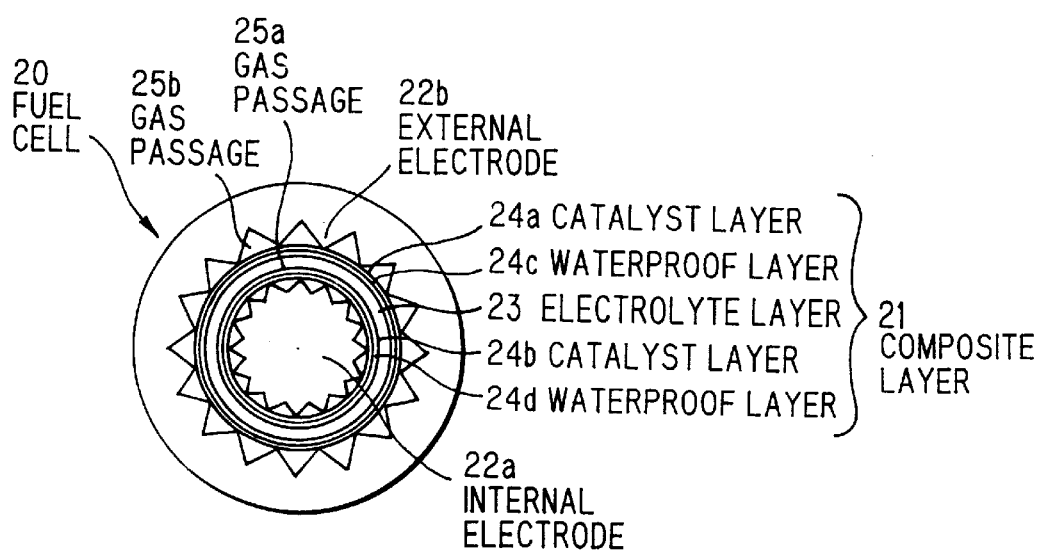

Further, as shown in FIG. 5B, the construction of the fuel battery cell 20 in the second preferred embodiment is substantially the same as that of the fuel battery cell 10 in the first preferred embodiment, except that the positive and the negative of the electrodes and, in addition, the passages of the fuel gases have been reversed.

Specifically, the fuel battery cell 20 in the second preferred embodiment comprises: an internal electrode 22a and an external electrode 22b respectively with predetermined lengths which are coaxially disposed while leaving a predetermined space between the internal electrode 22a and the external electrode 22b; and a composite layer 21 with a predetermined length, comprising an electrolyte layer 23 and internal and external catalyst layers 24a, 24b provided respectively on both sides of the electrolyte layer 23. Gas passages 25a, 25b are provided between the internal electrode 22a and the external electrode 22b while leaving a predetermined space between the internal and external electrodes 22a, 22b, and the composite layer 21 is disposed within the predetermined space. Further, in the composite layer 21, the surface of the internal catalyst layer 24a on its gas passage 25a side and the surface of the external catalyst layer 24b on its gas passage 25b side are covered respectively with a waterproof layer 24c and a waterproof layer 24d.

3. Third Preferred Embodiment

Figure 6A:
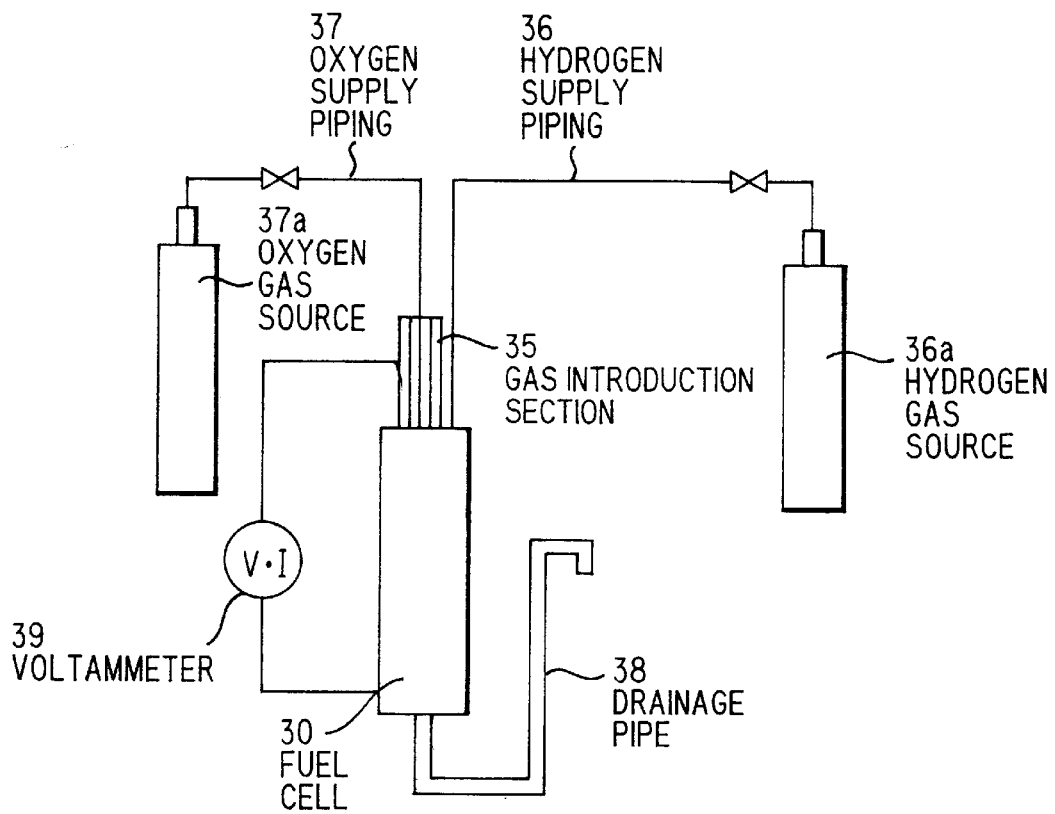

As shown in FIG. 6A, the third preferred embodiment of the fuel cell according to the invention comprises: a fuel battery cell 30; fuel gas supply pipings (hydrogen supply piping 36, a hydrogen gas source 36a, oxygen supply piping 37, an oxygen gas source 37a, and a drainage pipe 38) connected to the fuel battery cell 30; and a voltammeter 39.

Figure 6B:
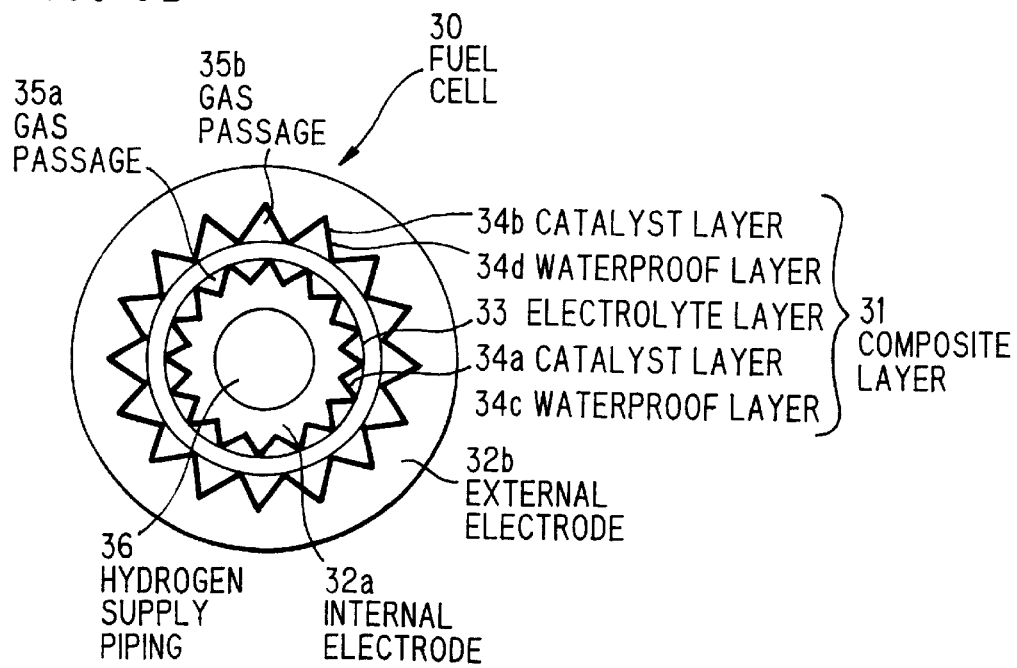

As shown in FIG. 6B, the construction of the fuel battery cell 30 in the third preferred embodiment is substantially the same as that of the fuel battery cell 10 in the first preferred embodiment, except that catalyst layers 34a, 34b are provided on the surface of grooves in the internal electrode 32a on its external surface and on the surface of grooves in the external electrode 32b on its internal surface.

Specifically, the fuel battery cell 30 in the third preferred embodiment comprises: an internal electrode 32a (provided with a hollow portion 36) and an external electrode 32b respectively with predetermined lengths which are coaxially disposed while leaving a predetermined space between the internal electrode 32a and the external electrode 32b; and a composite layer 31 with a predetermined length, comprising an electrolyte layer 33 and internal and external catalyst layers 34a, 34b provided respectively on the surface of grooves in the internal electrode 32a on its external surface and on the surface of grooves in the external electrode 32b on its internal surface. Gas passages 35a, 35b are provided between the internal electrode 32a and the external electrode 32b while leaving a predetermined space between the internal and external electrodes 32a, 32b, and the composite layer 31 is disposed within the predetermined space. In the composite layer 31, the surface of the internal catalyst layer 34a on its gas passage 35a side and the surface of the external catalyst layer 34b on its gas passage 35b side are covered respectively with a waterproof layer 34c and a waterproof layer 34d.

4. Fourth Preferred Embodiment

Figure 7:
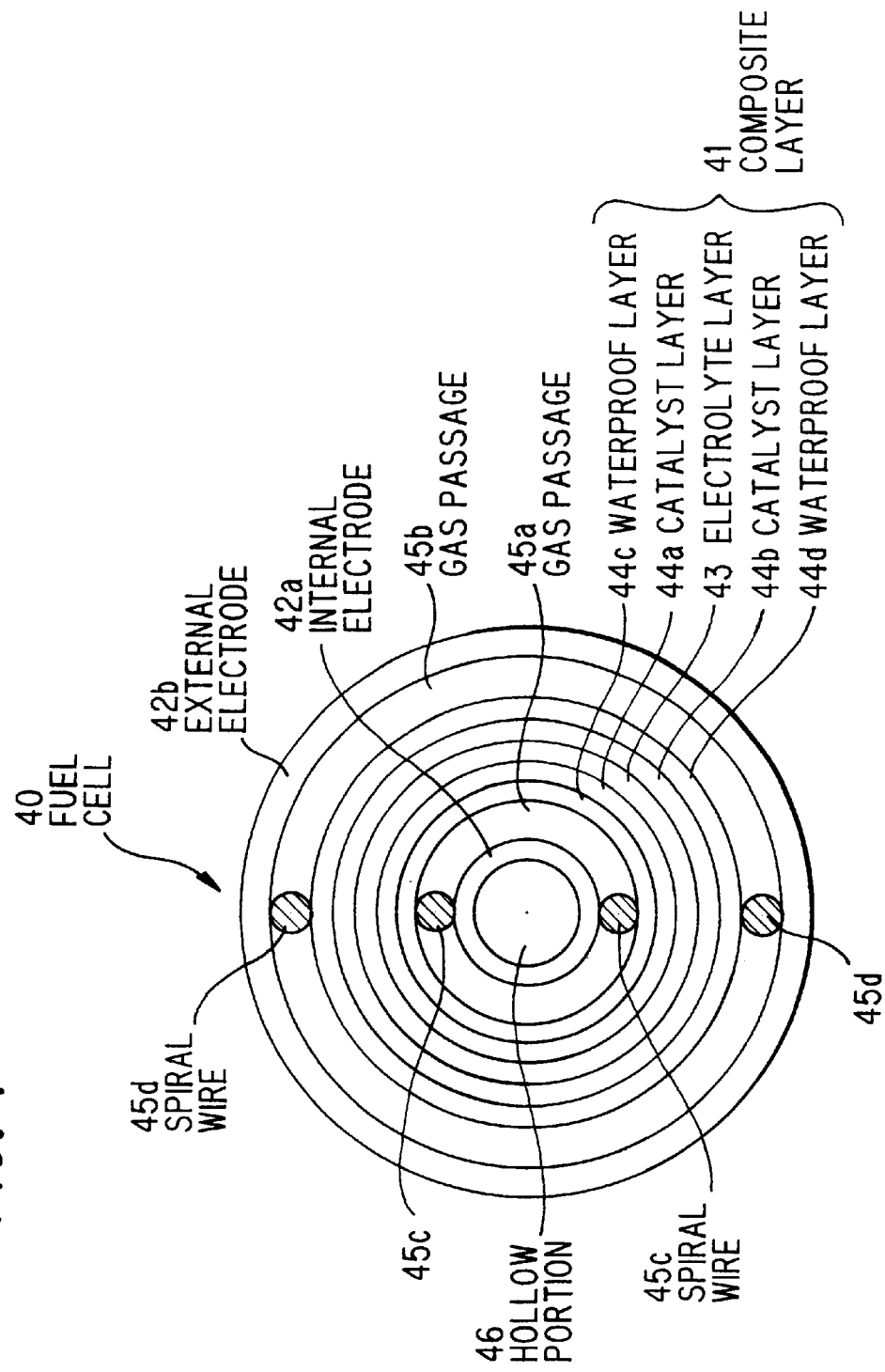
FIG. 7 is a schematic diagram illustrating a fourth preferred embodiment of the fuel cell according to the invention, wherein a gas passage has been formed by the interposition of a spiral wire.

As shown in FIG. 7, the construction of the fuel battery cell in the fourth preferred embodiment of the fuel cell according to the invention is substantially the same as that of the fuel battery cell 10 in the first preferred embodiment, except that, in the provision of gas passages 45a, 45b between the internal electrode 42a (provided with a hollow portion 46) and the external electrode 42b, spiral wires 45c, 45d are interposed instead of the use of grooves provided on the external or internal surface of the internal and external electrodes 42a, 42b. Here two spiral wires 45c are opposite to each other in the direction of the spiral. This is true of two spiral wires 45d.

Specifically, the fuel battery cell 40 in the fourth preferred embodiment comprises: an internal electrode 42a and an external electrode 42b respectively with predetermined lengths which are coaxially disposed while leaving a predetermined space between the internal electrode 42a and the external electrode 42b; and a composite layer 41 with a predetermined length, comprising an electrolyte layer 43 and internal and external catalyst layers 44a, 44b provided respectively on both sides of the electrolyte layer 43. Gas passages 45a, 45b are provided by interposing spiral wires 45c, 45d between the internal electrode 42a and the external electrode 42b so as to leave a predetermined space between the pass passages 45a, 45b, and the composite layer 41 is disposed within the predetermined space. In the composite layer 41, the surface of the internal catalyst layer 44a on its gas passage 45a side and the surface of the external catalyst layer 44b on its gas passage 45b side are covered respectively with a waterproof layer 44c and a waterproof layer 44d.

From the viewpoint of increasing the capacity, the fuel cell according to the invention may have a construction such that a plurality of the above type of fuel battery cells are stacked on top of each other or one another. The fuel battery cells may be combined in series or parallel. In this case, the performance of the battery cells is not deteriorated until the electrolyte layer is broken down.

The maximum current of the fuel cell according to the invention is determined by the product of the length of the fuel battery cell by the diameter of the fuel battery cell, that is, by the area of the solid electrolyte film. In the fuel cell according to the invention, even when a single battery cell is used, the supply of oxygen gas on the electrolyte layer side and the supply of hydrogen gas on the external side at a pressure of about 2 atm can result in the generation of an electromotive force of about 0.8 V across the internal electrode and the external electrode.

Further, as described above, there is no particular limitation on the arrangement of the positive electrode and the negative electrode so far as a pair of positive and negative electrodes are provided.

Furthermore, there is no particular limitation on the shape of the battery cell, and any of vertical and horizontal battery cells may be used so far as the produced water can be conveniently discharged.

II. Production Process of Fuel Cell

Figure 8A:
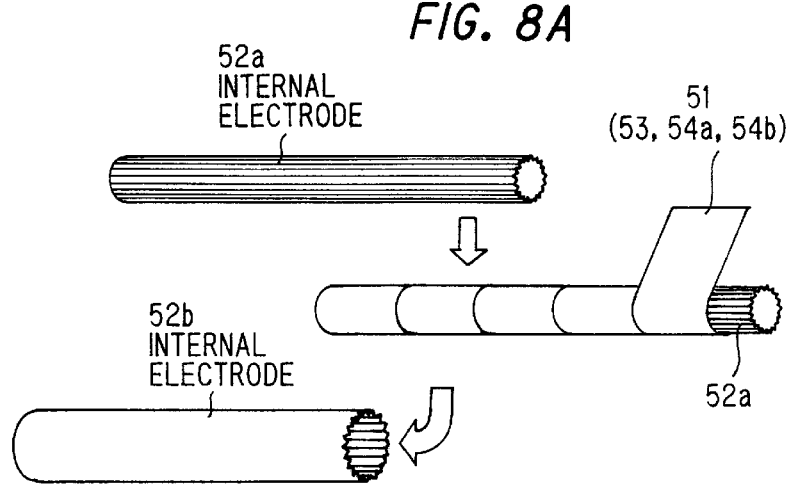
Figure 8B:
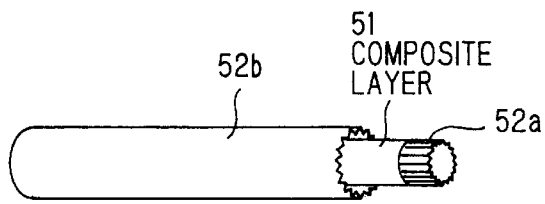
Figure 8C:
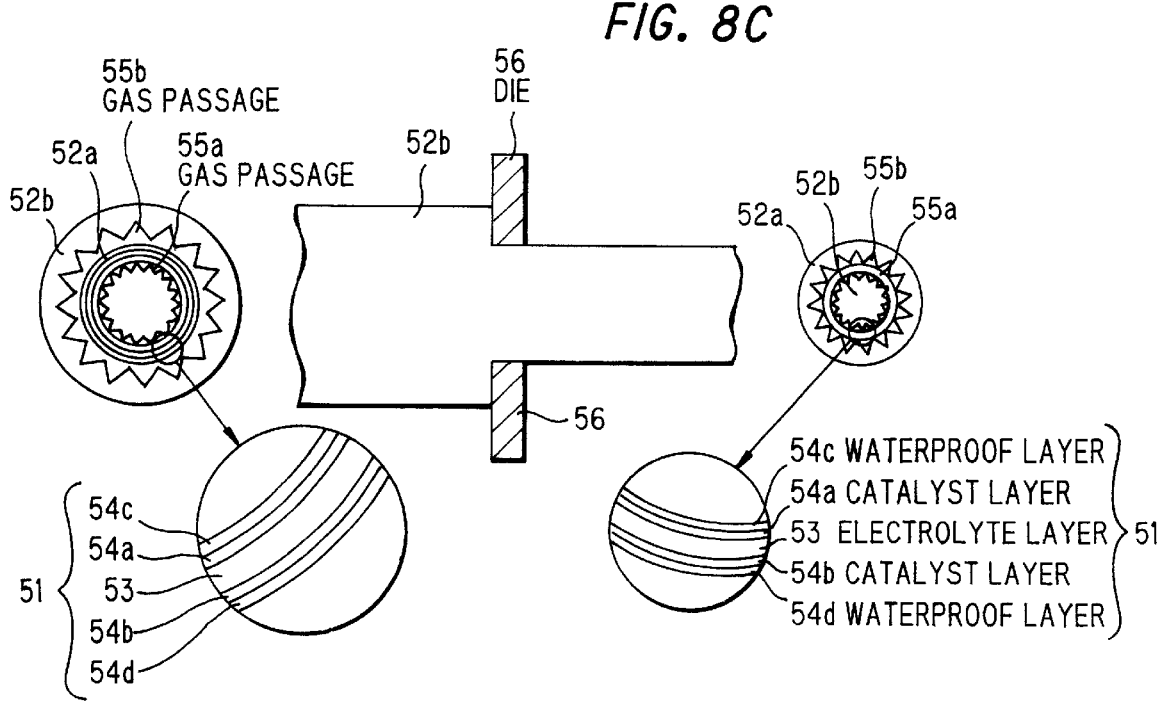

As shown in FIGS. 8A to 8C, the above fuel cell may be produced, for example, according to the following preferred embodiments.

An internal electrode 52a having a predetermined length is provided. A composite layer 51 with a predetermined length, comprising an electrolyte layer 53 and internal and external catalyst layers 54a, 54b provided respectively on both sides of the electrolyte layer 53 is provided. The internal electrode 52a is covered with the composite layer 51 so as to form a gas passage 55a between the internal electrode 52a and the composite layer 51. The internal electrode 52a covered with the composite layer 51 is inserted into an external electrode 52b having a predetermined length. The diameter of the external electrode 52b is reduced with a die 56 to form a gas passage 55b between the external electrode 52b and the composite layer 51, and, at the same time, the internal electrode 52a and the external electrode 52b are coaxially disposed to constitute a fuel cell.

In the composite layer 51, the surface of the internal catalyst layer 54a on its gas passage 55a side and the surface of the external catalyst layer 54b on its gas passage 55b side are covered respectively with a waterproof layer 54c and a waterproof layer 54d.

Figure 9A:
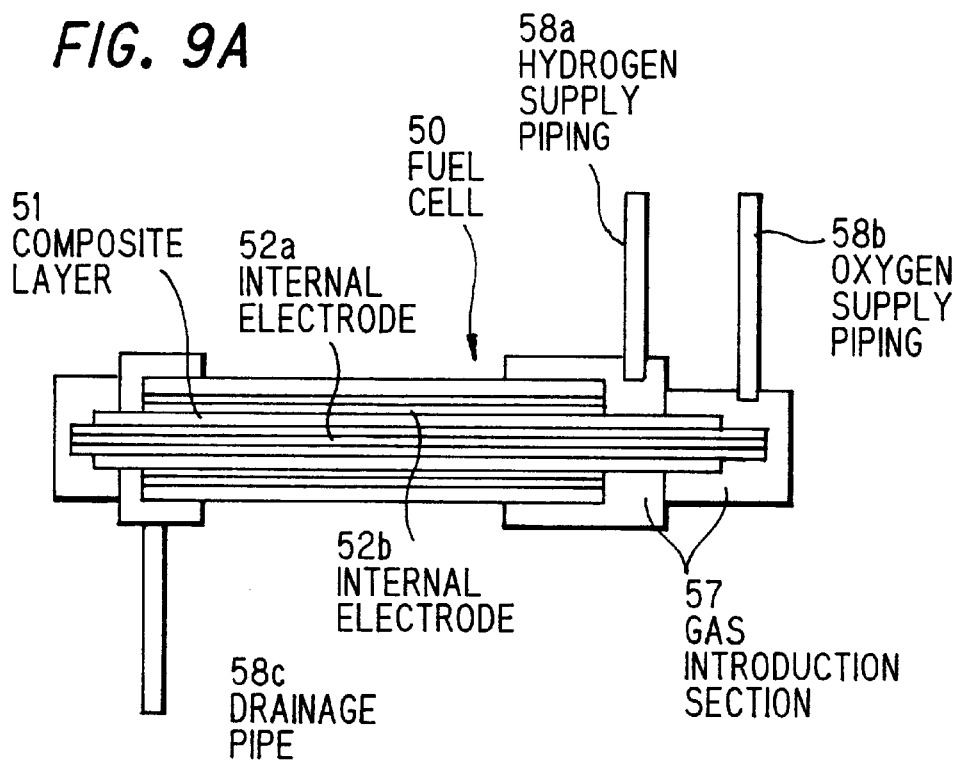
Figure 9B:
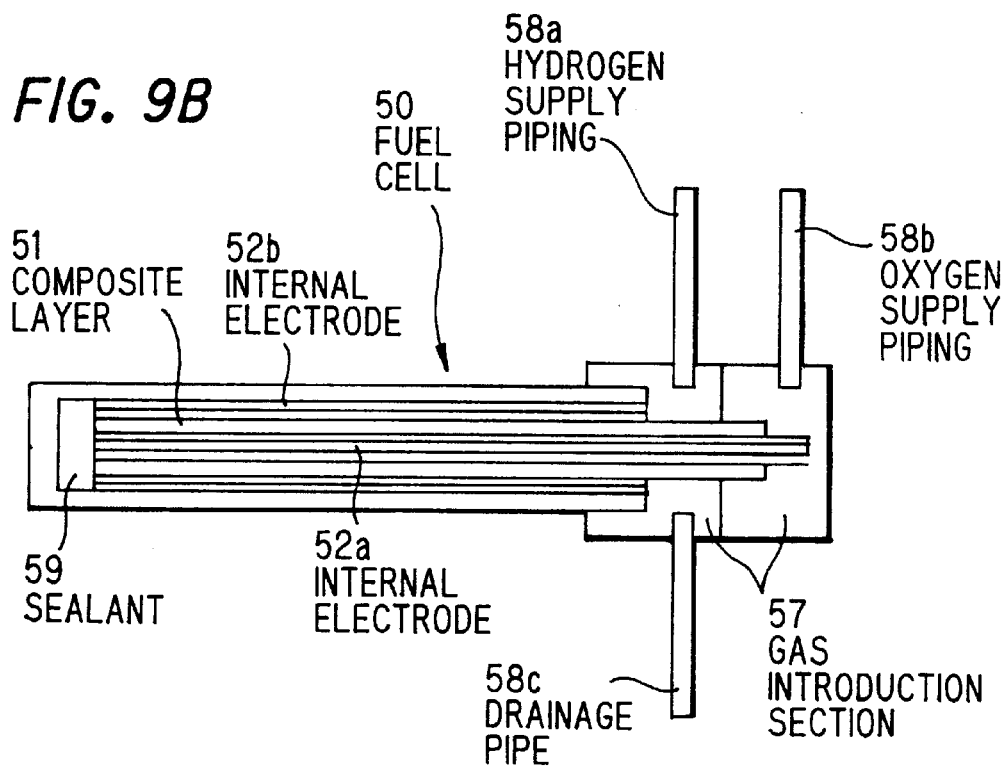

Further, as shown in FIGS. 9A and 9B, a gas introduction section 57 is preferably formed at the end face of the fuel battery cell 50. Hydrogen supply piping 58a, oxygen supply piping 58b, and a drainage pipe 58c are connected to the gas introduction section 57.

In the embodiment shown in FIG. 9A, the hydrogen supply piping 58a and the oxygen supply piping 58b are provided at the end of the battery cell 50 on its gas introduction section 57 side, and the drainage pipe 58c is provided at the end of the battery cell 50 remote from gas introduction section 57.

In the embodiment shown in FIG. 9B, all of the hydrogen supply piping 58a, the oxygen supply piping 58b, and the drainage pipe 58c are provided at the end of the battery cell 50 on its gas introduction section 57 side, and, at the same time, a sealant 59 is provided at the end of the battery cell 50 remote from the gas introduction section 57.

As is apparent from the foregoing description, the fuel cell according to the invention has a simple structure and can realize improved yield and reduced production cost. Likewise, the process for producing a fuel cell according to the invention can simplify the production process and can realize improved yield and reduced production cost.

The invention has been described in detail with particular reference to preferred embodiments, but it will be understood that variations and modifications can be effected within the scope of the invention as set forth in the appended claims.

What is claimed is:

1. A fuel cell comprising a fuel battery cell, said fuel battery cell comprising:

an internal electrode and an external electrode respectively with predetermined lengths which are coaxially disposed while leaving a predetermined space between the internal electrode and the external electrode; and a composite layer with a predetermined length, comprising an electrolyte layer and internal and external catalyst layers provided respectively on both sides of the electrolyte layer, at least one of the internal and external catalyst layers in the composite layer being covered with a waterproof layer, said composite layer being disposed in the predetermined space between the internal electrode and the external electrode while providing a gas passage between the composite layer and the internal electrode and providing a gas passage between the composite layer and the external electrode.

2. The fuel cell according to claim 1, wherein the internal electrode is a hollow or solid internal continuous member having a plurality of grooves on its external surface, the external electrode is a hollow external continuous member having a plurality of grooves on its internal surface, and the gas passages are defined by the plurality of grooves in the internal continuous member and the plurality of grooves in the external continuous member.

3. The fuel cell according to claim 1, wherein the internal and external catalyst layers are provided respectively in face contact with both sides of the electrolyte layer.

4. The fuel cell according to claim 2, wherein the internal and external catalyst layers are provided respectively in face contact with a plurality of grooves in the internal and external continuous members.

5. The fuel cell according to claim 1, wherein the fuel battery cell is one of a plurality of fuel battery cells connected to each other or one another either in series or in parallel.

6. A process for producing a fuel cell, comprising the steps of:

providing an internal electrode with a predetermined length;

providing a composite layer with a predetermined length, comprising an electrolyte layer and internal and external catalyst layers provided respectively on both sides of the electrolyte layer;

covering the internal electrode with the composite layer so as to form a gas passage between the internal electrode and the composite layer;

inserting the internal electrode covered with the composite layer into an external electrode with a predetermined length;

reducing the diameter of the external electrode to form a gas passage between the external electrode and the composite layer, and, at the same time, coaxially disposing the internal electrode and the external electrode to form a fuel cell, wherein at least one of the internal and external catalyst layers in the composite layer is covered with a waterproof layer.

7. The process according to claim 6, wherein a hollow or solid internal continuous member having a plurality of grooves on its external surface is used as the internal electrode, a hollow external continuous member having a plurality of grooves on its internal surface is used as the external electrode, and the gas passages are defined by the plurality of grooves in the internal continuous member and the plurality of grooves in the external continuous member.

8. A fuel cell comprising a fuel battery cell, said fuel battery cell comprising:

an internal electrode and an external electrode respectively with predetermined lengths which are coaxially disposed while leaving a predetermined space between the internal electrode and the external electrode; and a composite layer with a predetermined length, comprising an electrolyte layer and internal and external catalyst layers provided respectively on both sides of the electrolyte layer, said composite layer being disposed in the predetermined space between the internal electrode and the external electrode while providing a gas passage between the electrolyte layer and the internal electrode and providing a gas passage between the electrolyte layer and the external electrode.

* * * * *